Aug. 22, 1967  KIYOSHI ARAKAWA  3,336,795
SEMICONDUCTOR FORCE MEASURING DEVICE
Filed Dec. 18, 1964  2 Sheets-Sheet 1

INVENTOR
KIYOSHI ARAKAWA
BY
ATTORNEY

Aug. 22, 1967  KIYOSHI ARAKAWA  3,336,795
SEMICONDUCTOR FORCE MEASURING DEVICE
Filed Dec. 18, 1964  2 Sheets-Sheet 2

United States Patent Office 3,336,795
Patented Aug. 22, 1967

3,336,795
SEMICONDUCTOR FORCE MEASURING
DEVICE
Kiyoshi Arakawa, Kamakura, Japan, assignor to Shinko-Tsushin-Kogyo Kabushikikaisha, Zushi, Japan, a corporation of Japan
Filed Dec. 18, 1964, Ser. No. 419,452
3 Claims. (Cl. 73—136)

This invention relates to pressure or more generally force measuring devices and more particularly to such devices utilizing semi-conductor elements.

Strain gages are pressure measuring devices which responsive to slight pressures or forces produce output signals related to the value of the pressures. Ideally, such devices should be of small size, sensitive to slight pressures, simple in structure and operation, inexpensive, reliable, noise free and produce large output signals.

In the prior art different materials have been used in strain gages to transform pressures into electrical or other types of signals. For example, piezoelectric crystals have been used for such a purpose. Disadvantageously, piezoelectric crystals generate electric signals directly in response to deformations of the crystal by the pressure which are oftentimes so small in magnitude that delicate meters must be used or amplification must be used. Also disadvantageously, the crystal is connected directly into circuit with the meter, and its accuracy is reduced by the reactive and resistive elements thereof.

Since discovery of the transistor principle, much attention has been directed to use of semiconductors to measure pressure. In the ordinary type of semiconductor device having a rectifying barrier, and an ordinary positive going VI characteristic curve, that is, without any substantial negative resistance region, pressure tends to increase the resistivity probably because pressure decreases the mobility and increases the energy gap of the material. Signals thus generated by the device would be changed proportionally and dependent upon the pressure applied to the device. As in the case of the piezoelectric crystal strain gage, since the transducing element is connected directly to the meter, the reactive and resistive elements of the external meter would tend to adversely affect the resistivity of the device and hence reduce its accuracy. To overcome this effect, delicately balanced meters, amplifiers and other complex schemes have been tried, all of which reduced but never entirely overcame the disadvantage of directly connecting the tranducing element to a measuring element.

Accordingly, an object of my invention is to eliminate this direct connection between the transducing element and the measuring device.

A further object of my invention is to improve the accuracy, reliability, and sensitivity of pressure measuring devices by applying a new principle to effect operation thereof.

Other objects of my invention are to simplify strain gages and the electrical circuits utilized therewith, reduce their size, and decrease their cost.

These and other objects of my invention are attained in an illustrative embodiment thereof which is a pressure or force measuring device utilizing a new principle. Whereas heretofore semiconductor strain gages have utilized resistivity changes of a semiconductor element having an ordinary VI characteristic curve to effect changes in the magnitude of output signal, as in the same manner as a piezoelectric crystal, my invention utilizes a semiconductor device having a VI characteristic curve with a negative resistance region, and suitably biased to enable pressures applied thereto to change the operating points on the curve such that frequency of switching is varied directly in proportion to the pressure applied. Thus, my invention measures pressures by changes of frequency, a more accurate, reliable and simpler way which eliminates the necessity of a direct connection between the transducing element and the meter used therewith.

In this illustrative embodiment, I have a semiconductor wafer of one type of conductivity and a zone of a material of another type of conductivity disposed thereon to form a rectifying junction therebetween and a first and a second ohmic contact attached to the wafer. Biasing means are provided to the contacts such as to perform the foregoing function.

In one embodiment of my invention, I utilize a tank circuit comprising a capacitor and a resistance connected to the semiconductor device to form a sustained oscillatory circuit. Energy is stored in the capacitor until a discharge point on the positive region of the VI curve of the device is reached. At that time, the capacitor is discharged through the semiconductor until another operating point in the negative region of the VI curve is reached, and the capacitor is again charged. Pressure applied to the device will cause the operating points to be changed such that the time of charge and discharge of the capacitor, and hence the frequency of oscillation, will be changed. Although, the mechanism of device operation may be explained in terms of changing the operating point by application of pressure, another way to explain the mechanism is the change of internal resistance of the semiconductor by pressure to enable different operating curves. The negative resistance region, however, is necessary to enable the changing of frequency with pressure.

One specific illustrative embodiment of my invention can be used in combination with a photo-responsive element and a light source and other electrical circuits to form a torsion meter or power meter whose transducing element can advantageously be placed on the shaft of a motor and without any mechanical coupling or linkage with external meters. The immediately described oscillator is attached to the shaft of a motor. Power to operate the oscillator is derived from the photo-responsive cell, light being supplied from a source external to the shaft once per revolution of the shaft. The torque of the moving shaft causes a torsional deformation of the semiconductor wafer to cause change of the frequency of the oscillator in a manner as just described. By means of a light wave or electromagnetic wave, the frequency signal of the device and the magnitude of the voltage from the photocell, which is proportional to the speed of the shaft, is transmitted to an external measuring circuit. Thus, advantageously, no contacting arrangement is necessary as is the case with the prior art devices, and my invention eliminates noise and loss of power occasioned by such contacting arrangements, and is of greater utility since it need not be limited to a certain test position as is the case with the prior art torque and power meters.

A feature of my invention is a device for measuring pressure especially of slight magnitudes by frequency.

A further feature of my invention is a semiconductor wafer having at least one rectifying junction and having a VI characteristic curve with a negative resistance region, and means for biasing the junction so that deformation of the wafer by pressure will cause changes in the operating points of the curve and thereby enable change of the frequency of switching.

A yet further feature of my invention is that the semiconductor wafer is of one type of conductivity and the rectifying junction is formed by a spot of a material of a different type of conductivity being alloyed to the wafer at substantially the center of one surface thereof, and a pair of ohmic contacts are attached to the wafer on a second surface thereof, and the resulting device is suitably biased to enable deformation of the wafer to change the operating curve.

Another feature of my invention is the combination of the above semiconductor wafer, rectifying junction and biasing means and a tank circuit comprising a reactive means, such as a capacitor, and a resistive means to form an oscillator generator, the output signal of which has a frequency determined by the operating points of the wafer device as controlled by pressures applied thereto.

It is another feature of my invention that in one aspect it is utilizable as a torque meter or a power meter by attaching the wafer device on the shaft of a motor and supplying power to operate the device by means of a photo-cell which is energized by a light source external to the shaft, and means for transmitting the resulting oscillatory signal and photo-cell voltage to an external measuring and computing circuit.

A complete understanding of my invention and of these and other objects, features, and advantages thereof may be gained from the following detailed description and the accompanying drawing, in which;

FIG. 2;

Figure 1:
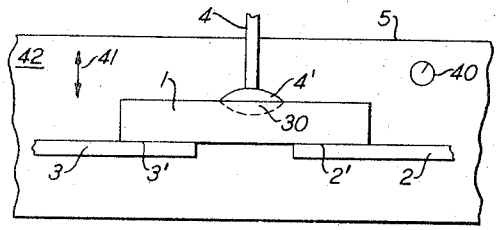
FIG. 1 depicts a transducing element of an illustrative embodiment of my invention.

Referring to the drawing, FIG. 1 shows a device 42 comprising a semiconductor or wafer element 1 in which a rectifying junction 30 is formed by spot 4', and on which a first contact 2 and a second contact 3 are formed. A third contact 4 is attached to the spot 4'. The wafer 1 is of a first type conductivity, for example of silicon or germanium and of N-type. The spot 4' can be of second type conductivity, for example, of P-type material which is alloyed or otherwise formed on the wafer 1 to form the rectifying junction therebetween. The contacts 2 and 3 may be of gold-antimony alloy or gold-gallium alloy according to N- or P-type desired, respectively, and is resistance welded to the wafer in the manner depicted. Although it is not essential, the junction is preferably in the center of one surface (as depicted, the top surface) of the wafer 1. The three terminal device 42, hereinafter referred to as the transducing element, is shown on a testing piece 5, from which pressure is applied coming out of the drawing as depicted by arrow 40 or going into the paper. Although, the direction of pressure is shown to be perpendicular to the plane which contains the contacts 2 and 3, junction 30 and wafer 1, pressure can also be applied and measured from a direction indicated by double headed arrow 41. The direction of pressure application is not essential, although one direction may predominate to some extent due to the pecularities of the particular crystal structure being employed. However, as will be discussed, it is the frequency of signal output which will determine the pressure measurement.

Figure 3:
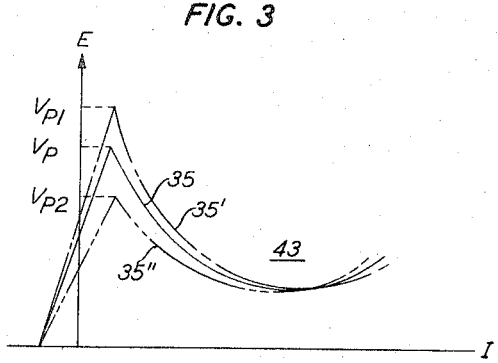
FIG. 3 depicts voltage-current characteristics of the illustrative embodiment of FIG. 1.

The VI (voltage-current) characteristics of the transducer element 42 of FIG. 1 is illustratively depicted in FIG. 3. It is important to note that there is a negative resistance region 43 in the curves. It is this characteristic which enables my invention to measure pressures by frequencies. As is readily apparent, when a particular voltage level, such as $V_p$, is reached at a particular current value, the transducer element will become a generator. If the current is then decreased, the voltage will again increase until it attains the cutoff value, such as $V_p$. In this manner, it is possible to cause oscillation. In my invention, the cutoff value is varied when pressure is applied to the semiconductor wafer 1 of FIG. 1. The exact mechanism of this change of operating points by pressure is not completely understood, however, it is thought that pressure causes deformation of the crystal lattice and causes variations of energy gaps therein, and hence causes change of the resistivity of the crystal. In this manner, the VI curve is changed as to the cutoff value in some proportion to the pressure applied. The bottom of the negative resistance region does not appear to vary substantially. Thus, oscillation may take place between the cutoff value and the bottom of the curve. As can be understood, when the cutoff value is increased, as may be the case with increased pressure, the amplitude of the output signal from the transducer element 42 is increased and the frequency is decreased. On the other hand, when the cutoff value is decreased, as may be the case with decreased pressure, the output signal amplitude is decreased and the frequency is increased.

Figure 2:
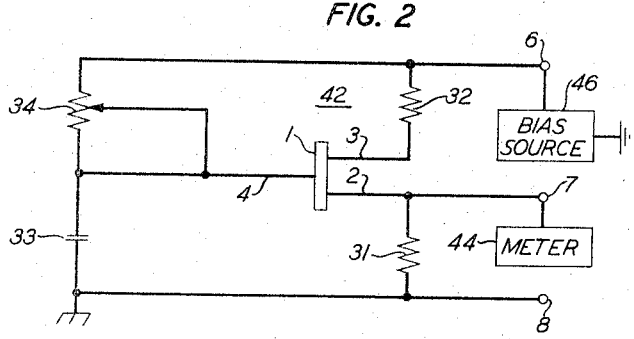
FIG. 2 depicts a transducer element and a tank circuit combined to form an oscillator generator illustrative of the principles of my invention.

To enable sustained oscillation of the transducer element 42, it is desirable to have a tank circuit, or some form of energy storage means. One such means is illustrated in FIG. 2, which is a schematic diagram of the transducer connected to the spot terminal 4, contact 2, capacitor 33, resistor 31, contact 3, variable resistor 34 and resistor 32. Terminal 6 is an input terminal. Terminal 7 is an output terminal and terminal 8 is ground. Resistor 31 may be used to obtain output signals or voltages. Resistor 32 may be used for biasing the transducer element 42. Resistor 34 may be used to charge capacitor 33 and forms the tank circuit therewith. Biasing may be provided by bias source 46. The frequency of the output signal may be detected by frequency meter 44 which is connected to the output terminal 7.

Operation of this embodiment of FIG. 2 can be best explained by simultaneously referring to FIGS. 2, 3, 4A and 4B. When a D-C voltage signal from source 46 is applied to the input terminal 6, a certain bias voltage is supplied to contacts 2 and 3 and hence to the junction 30 of the transducing element 42. Consequently, the voltage-current characteristic depicted in FIG. 3 (for example, the reference level is solid line 35) is obtained between the contact 2 and contact 4. The input voltage charges capacitor 33 through resistor 34.

Figure 4A:
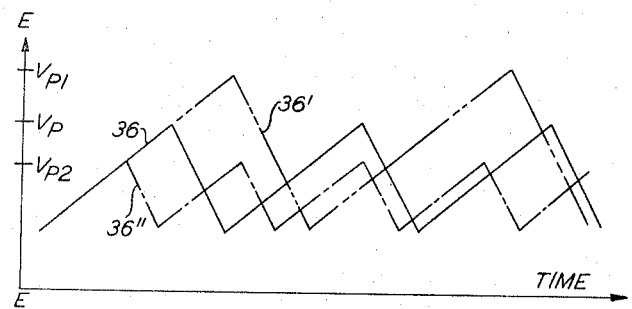
FIG. 4A depicts variations of output voltages plotted against time taken at the rectifying junction of the embodiment of FIG. 1.
Figure 4B:
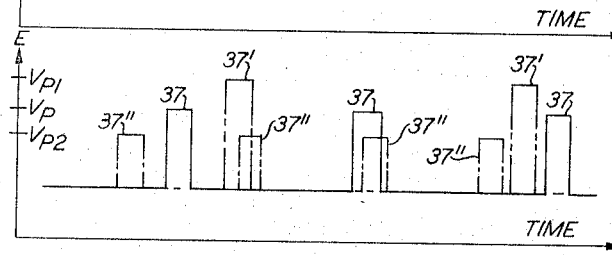
FIG. 4B depicts output voltage pulses taken at the output terminals of the transducer as plotted against time.

As the input voltage to the transducer 42 is increased to the reference cutoff value (e.g. $V_p$ as depicted in FIGS. 3, 4A, 4B), capacitor 33 is caused to discharge because the transducer goes into its negative resistance region (depicted as 43 in FIG. 3) and becomes a generator. The discharge of the capacitor 33 is through the resistor 31. Upon reaching a certain voltage value, the current drops and the charging of the capacitor 33 again begins. The cycle is repeated.

With respect to time, there will be generated a saw tooth wave (e.g. 36) at the junction 30 of the transducing element 42 as shown in FIG. 4A. The peaks of the saw tooth waves correspond to the cutoff value of the transducer 42, and the bottoms correspond roughly to the bottoms of the negative resistance region. The capacitor 33 and resistor 34 should be of suitable value for suitable saw tooth wave shape. The pulses (e.g. 37) depicted in FIG. 4B are taken across resistor 31 and at the output terminal 7. The pulses have their leading edges corresponding to the peaks of the saw tooth waves of FIG. 4A. They depict illustratively the different frequencies of oscillation for correspondingly different pressures.

Assume that a pressure is applied to the transducer 42, such as in a direction depicted by arrow 40 in FIG. 1, to deform the wafer 1. The potential distribution in the crystal is altered in some quantum mechanical way to cause change of internal resistivity, and thereby cause change of the VI characteristic, more particularly the cutoff value. Assume, that the changed cutoff value is $V_p1$ (as depicted in FIG. 3). This causes increased amplitude of the saw tooth wave (e.g. 36') as shown in FIG. 4A. The charging and discharging times of the capacitor 33 will accordingly increase and the frequency of the output signal will thus decrease, as is apparent by reference to pulse train 37' of FIG. 4B.

On the other hand, assume a different and smaller pressure is now applied to the wafer 1 of transducer 42 to cause the cutoff value to be $V_p2$ as shown in FIG. 3. This will cause decrease in the amplitude of the signal at the junction 30 as shown by saw tooth wave 36" in FIG. 4A. Consequently, the frequency of the output pulse train obtained across resistor 31 of FIG. 2 is increased as depicted by pulses 37" in FIG. 4B.

In this manner, it is possible by my invention to obtain the value of the pressure by determining the frequency of the output signal of the device. A frequency meter 44 connected to the output terminal 7 performs this function and enables direct reading of the pressure. Advantageously, my invention does not depend upon any direct contact between the semiconductor wafer 1, whose change of resistive and energy gap characteristics are controlled by the pressure, and the meter which records the pressure. Thus, meter readings are completely independent of and do not adversely interfere with the transducing of pressure to frequency change. Whatever interferences the resistances and capacitance used in the device may cause they are not detrimental to operation of my invention.

Figure 5:
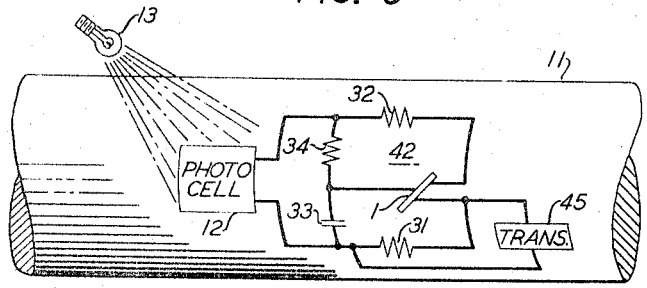
FIG. 5 depicts a torque or power meter utilizing the device of FIG. 2.

FIG. 5 depicts one possible use of the illustrative embodiment of FIG. 2 to measure torsion or torque of a motor. The embodiment of FIG. 2 may be attached to the shaft 11 of a motor. The biasing and operative power may be supplied by a photocell 12, which may also be attached to the shaft 11, such as by pasting. The optical energy to energize the cell 12 is provided by source 13 which is illustratively depicted as a lightbulb, but can be of any other type. The power may be of any other type such as a coil for the reception of electromagnetic energy. The wafer 1 is disposed at 45 degree angle to the axis of the shaft in orer to obtain the best distribution of torque forces and to cancel out any extraneous interfering forces. As can be understood, from the figure, light is flashed upon the photocell once per revolution of the shaft.

Advantageously, my invention is small and still very sensitive. Thus, I can attach the embodiment of FIG. 2 to any shaft of various sizes and obtain torque measurements therefrom. Heretofore, torque measurements have necessitated actual mechanical coupling of the shaft of a motor to a test device having a spring or other contacting force comparison mechanism. This produced loss of power from the motor and hence inaccuracy of measurement; produced noisy results because of the mechanical elements used therein, and required special test positions for the test equipment; and often tests were conducted in non-actual working conditions. My invention advantageously eliminates the necessity of mechanical coupling or contacting mechanisms and thus reduces noise substantially and also enables flexible use in any position and the testing of torque under actual working conditions.

When the motor is turning the shaft, a torque or centrifugal force will act on the semiconductor wafer 1 of the transducer 42 to cause its deformation. The deformation will cause, in the manner described above, change of the cutoff value of the VI characteristic curve of the transducer element, and hence change of the oscillation frequency of output signals from the embodiment of FIG. 2.

Figure 7:
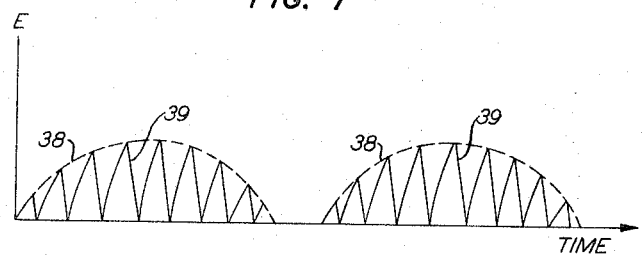
FIG. 7 depicts voltage signals from the embodiment of FIG. 5 which are transmitted to the system of FIG. 6 as plotted against time.

The signal at the output resistor 31 as depicted in FIG. 7 may be a composite of the voltage (envelope 38) obtained from the photocell 12, which is generated once per revolution of the shaft, and the pulses (39) from the device as determined by the torque as to frequency. This information can be transmitted by a transmitting means 45, in the form of an electromagnetic means such as a coil, to a measuring and computing means external to the shaft. The transmitting means 45 may also be constructed, for this purpose, in the form of light-wave means.

Advantageously, the use of a photocell which is energizable once per revolution of the shaft enables recordation of the speed of the motor, and furthermore, the embodiment of FIG. 2 enables recordation of the torque of the motor. Thus, these two informations can easily be converted by a computer to an indication or measurement of power, and hence horsepower can also be determined directly.

Figure 6:
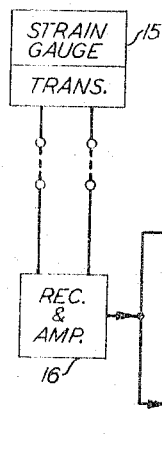
FIG. 6 depicts in block diagram form the torque meter of FIG. 5 and a system for monitoring the results of the torque meter without mechanical connection to the measured source.

Such an arrangement for measuring and computing is depicted in FIG. 6, which shows in block diagram form, the embodiment of FIGS. 2 and 5 and the transmitter of FIG. 5 as block 15. A receiver, such as a flux meter or other magnetic recorder, is shown combined with an amplifier of received signals as block 16. The received and amplified signal is then concurrently applied to a first frequency determining circuit 17, which determines the frequency of the pulse trains 39 of FIG. 7 and hence measures the torque of the motor, and to a second frequency determining circuit 18 which determines the frequency of the envelopes 38 of FIG. 7 and hence measures the speed of the motor. The output of these respective circuits 17 and 18 are applied to a computer 22 which computes the power output by the motor according to the general formula (a) Power = speed × torque; or in terms of horsepower (b) horsepower = $\frac{\text{speed} \times \text{torque}}{71620}$ The horsepower is then indicated directly on a meter 23.

The respective frequency converter circuits 17 and 18 are so constituted that the envelope 38 is counted in one (such as circuit 17) and the pulses in the pulse train 39 are counted in the other (such as circuit 18). Such frequency converter circuits can comprise, for example, the circuits 17 and 18. As shown in FIG. 6, circuit 17 has a modulator 19 and a frequency meter 20. Circuit 18 includes a rectifying circuit 21, a modulator 19 and a frequency meter 20.

In the foregoing manner, my invention enables sensitive, rapid and simple measuement of torque and power of a motor without the necessity of engaging or coupling the shaft of the motor to a complex testing mechanism.

Although, I have described one use of my invention as a torque meter, and a power meter, many other uses can be found therefor. The use of contact free measurement of torque has many uses, which would be apparent to one skilled in the art.

It is to be understood that the above-described arrangements are illustrative of the principles of my invention. Numerous other arrangements may be devised by those skilled in the art without departing from the spirit and scope of my invention.

What is claimed is:

1. A torque meter for attachment to a rotatable shaft comprising a device including a semiconductor wafer having a rectifying junction therein and having a negative resistance region in its VI characteristic; means for biasing said device such that rotation of said shaft will cause deformation of said wafer to cause change of the operating point on said VI characteristic and thereby enable change of the switching frequency of said device; a tank circuit including a reactive means and a resistive means connected to said device to form an oscillator generator whose frequency of oscillation is indicative of the torque established by said rotatable shaft; a photo cell attached to said shaft for providing power to said device, and being responsive to light from a source external to said shaft once per revolution thereof; means for transmitting a signal which combines the output signals of said oscillator generator and signals from said photocell; and means external to said shaft for receiving said combination signal and for computing the power output of said shaft.

2. A power output meter which can be used without mechanical contact with the shaft of a motor whose power is desired of measurement, comprising, in combination, a device attachable to said shaft including a semiconductor wafer of one type conductivity, a spot of a material of a second type of conductivity alloyed to said wafer to form a rectifying junction therewith, said device having a VI characteristic having a negative resistance region, and a first and a second contact attached to said wafer, means for biasing said first and second contacts such that torsion resulting from rotation of said shaft will cause deformation of said wafer and control the operating curve of said characteristic and thereby control the switching amplitude and frequency, said biasing means comprising photo-responsive means attached to said shaft, light source external to said shaft for supplying light to said photo-responsive means once per revolution of said shaft, a tank circuit means including reactive means and resistive means connected to said device to form an oscillatory circuit therewith whose frequency of oscillation is indicative of the torque of said shaft, means attached to said shaft for transmitting signals indicative of said oscillatory frequency and voltage from said photo-responsive means indicative of the speed of said shaft, and means independent of said shaft for receiving said indicative signals and for computing therefrom the power of said motor.

3. A force measuring apparatus attachable to a member to which a force is applied, comprising, in combination, a device including a semiconductor wafer having a rectifying junction therein, and having a negative resistance region in its VI characteristic; means for biasing said device so that said force applied to said member will cause deformation of said wafer to cause change of the operating point of said VI characteristic and thereby enable change of the switching frequency of said device; a current circuit including a reactive means and a resistor means connected to said device to form an oscillator generator whose frequency of oscillation is indicative of the force applied to said member; a photocell attached to said member for providing power to said device and being responsive to light from a source external to said member; and means for transmitting a signal which combines the output signals of said oscillator generator and signals from said photocell.

References Cited
UNITED STATES PATENTS

| | | | |
|---|---|---|---|
| 2,531,228 | 11/1950 | Macgeorge | 73—136 |
| 2,769,926 | 11/1956 | Lesk | 307—88.5 |
| 2,863,056 | 12/1958 | Pankove | 317—235 X |
| 2,863,070 | 12/1958 | Suran et al. | 307—88.5 |
| 3,107,277 | 10/1963 | Rogers | 73—88.5 X |
| 3,182,492 | 5/1965 | Sikorski | 73—88.5 |
| 3,183,705 | 5/1965 | Welkowitz | 73—362 X |

OTHER REFERENCES

C. M. Sinclair, "Negative Resistance Devices," Instrument Practice, November 1962, pages 1368–1376.

JAMES J. GILL, *Acting Primary Examiner.*

RICHARD C. QUEISSER, *Examiner.*

C. A. RUEHL, *Assistant Examiner.*